United States Patent

[11] 3,622,003

| [72] | Inventors | James I. Czech<br>Stevensville;<br>Clark I. Platt, Benton Harbor, both of Mich. |
|---|---|---|
| [21] | Appl. No. | 16,108 |
| [22] | Filed | Mar. 3, 1970 |
| [45] | Patented | Nov. 23, 1971 |
| [73] | Assignee | Whirlpool Corporation<br>Benton Harbor, Mich. |

[54] FILTER FOR A WASHING APPLIANCE
18 Claims, 15 Drawing Figs.

[52] U.S. Cl. .................................................. 210/108,
210/356, 210/411, 210/488
[51] Int. Cl. .................................................. B01d 29/38
[50] Field of Search .................................................. 210/82,
411, 488, 356, 108

[56] References Cited
UNITED STATES PATENTS

| 1,643,299 | 9/1927 | Furness | 210/488 |
| 1,677,892 | 7/1928 | Herbert et al. | 210/488 |
| 3,006,478 | 10/1961 | Mueller | 210/356 |
| 3,195,730 | 7/1965 | Mueller | 210/488 |
| 3,543,542 | 12/1970 | Bochan | 210/488 X |

Primary Examiner—John Adee
Attorneys—James S. Nettleton, Thomas E. Turcotte, Burton H. Baker, Donald W. Thomas, Gene A. Heth, Franklin C. Harter, Anthony Niewyk, Robert L. Judd and Hill, Sherman, Meroni, Gross & Simpson ABSTRACT: A filter or trap, especially adapted for removing lint and particulate material from wash water in automatic domestic washing machines having wash and drain cycles, comprises a self-contained unit with a stack of centrally apertured filter disks within a housing having a lower end filtering cycle suction outlet communicating with the chamber defined within the stack by the disk apertures. Fluid to be filtered such as wash water delivered to the housing is forced to pass between the disks of the stack to the aperture chamber. To flush the filter, flushing fluid such as water is introduced through the outlet, now serving as a flushing fluid inlet, into the disk stack chamber which causes the disks to separate and be agitated and flush clear of filtered material which is carried off to drain through the inlet, now serving as a drain outlet, through which fluid to be filtered is normally delivered to the housing.

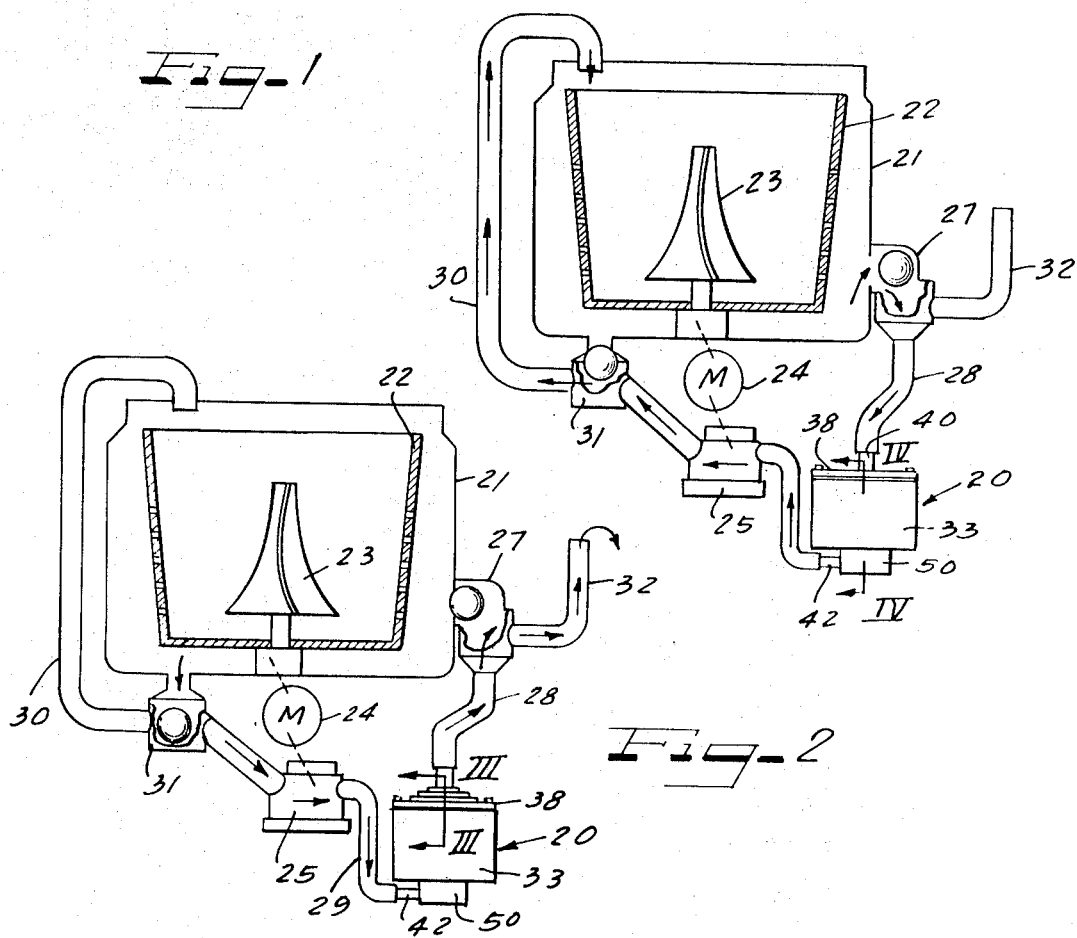
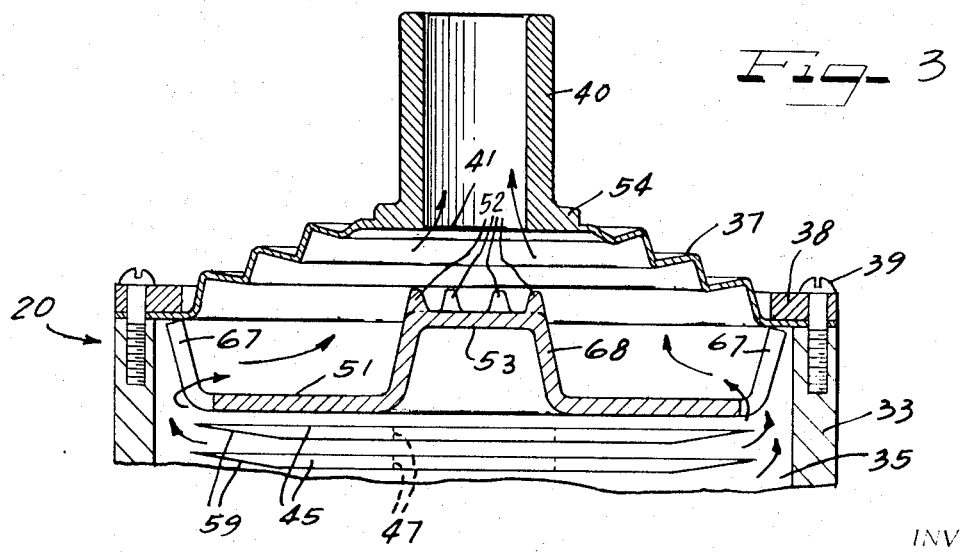
INVENTORS
JAMES I. CZECH
CLARK I. PLATT

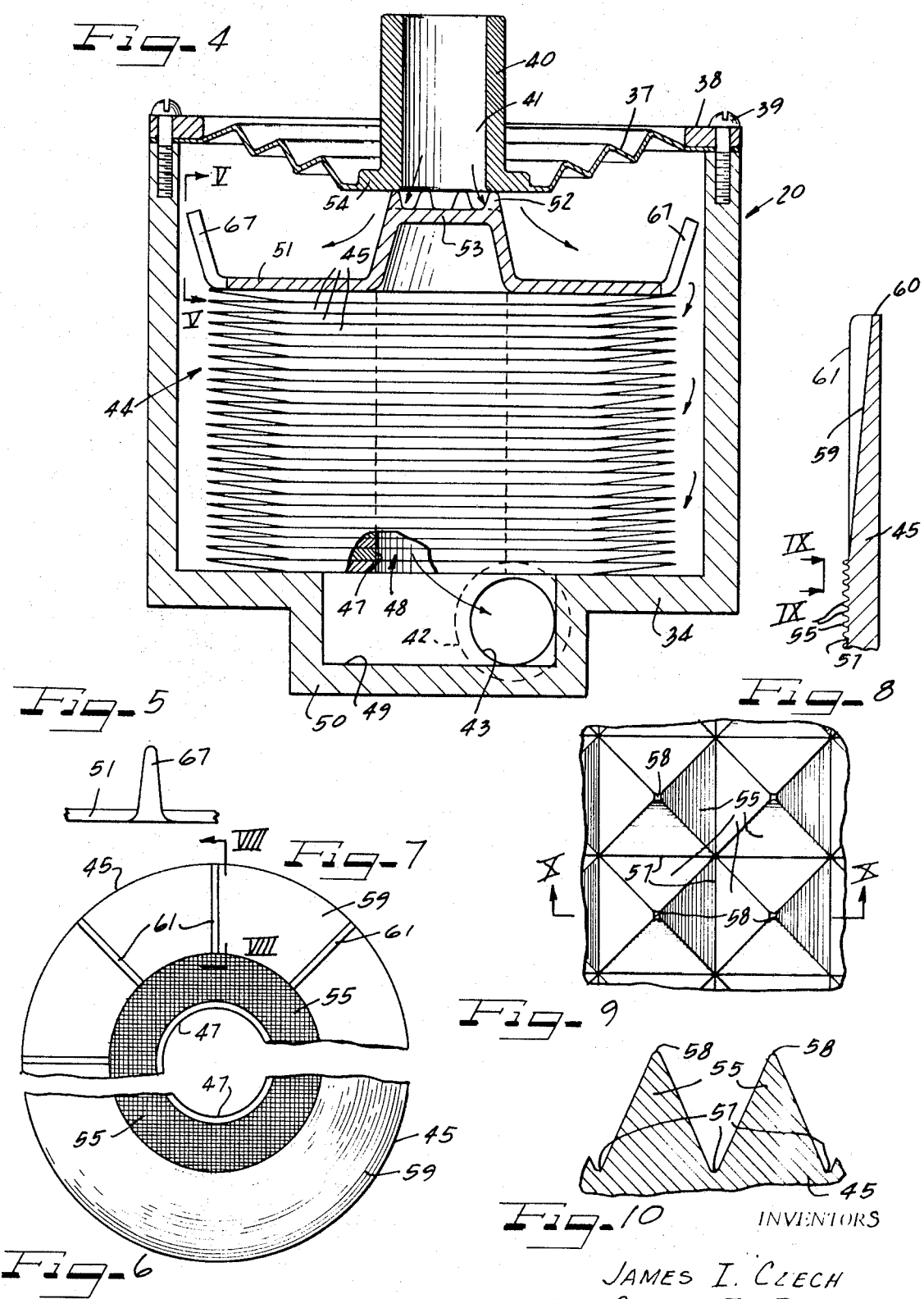

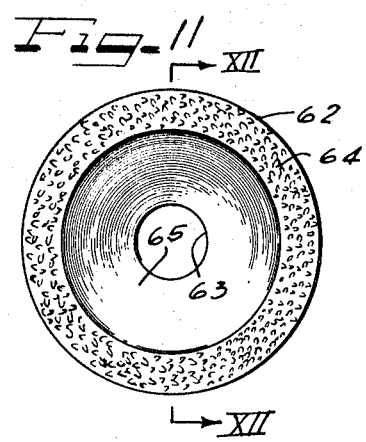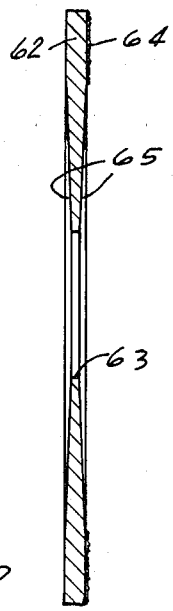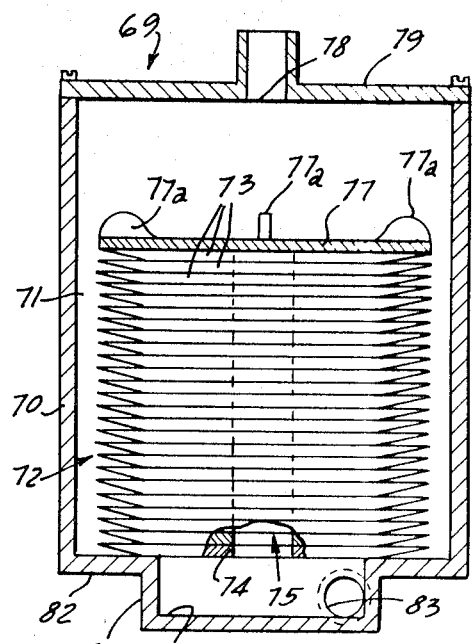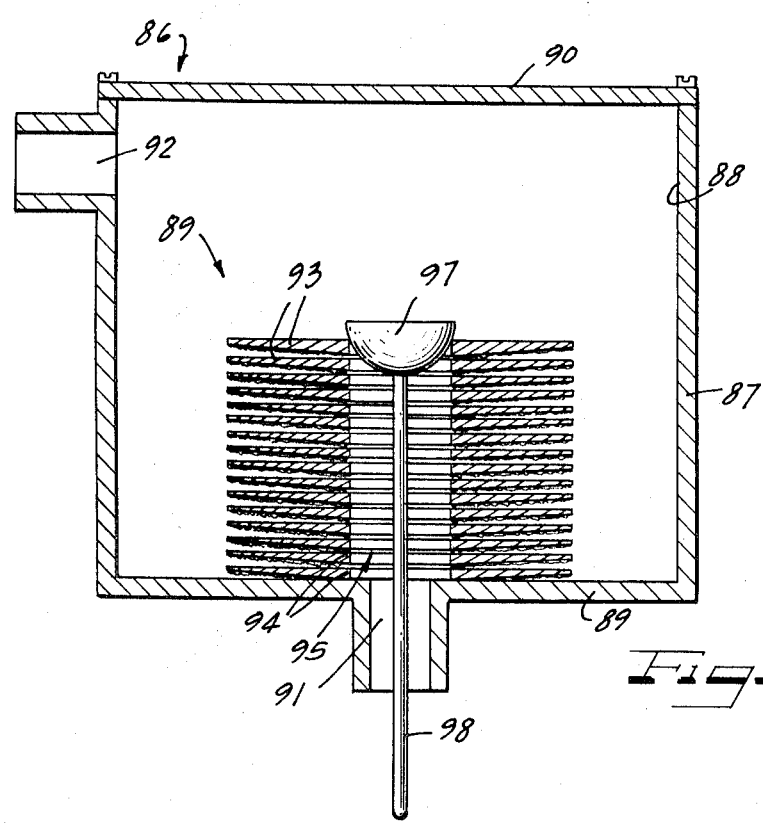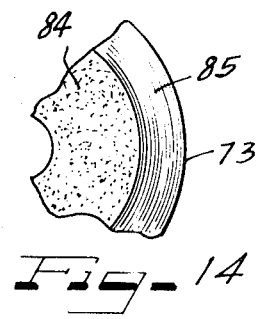

FILTER FOR A WASHING APPLIANCE

This invention relates generally to filtering apparatus, and is more particularly concerned with a self-cleaning, self-contained unit especially adapted for use with automatic domestic washing machines having wash and drain cycles.

Filtering of lint and other particulate material from wash water in washing machines where the wash water is recirculated has presented a continuing problem. Various filtering and lint-trapping arrangements have heretofore been proposed but they have been subject to one or more of various disadvantages and deficiencies, among which may be mentioned liability to clogging, uneven separation of lint from the wash water, necessity for manual cleanout, limited capacity, complex and expensive structure, and the like.

It is, therefore, an important object of the present invention to provide a new and improved filter or trap which will overcome the foregoing and other deficiencies, shortcomings, inefficiencies, and problems, but which is simple and rugged in construction, of low cost, and highly efficient for the intended purpose.

Another object of the invention is to provide a new and improved filter of the character indicated which is unusually efficient in substantially uniformly removing lint and other particulate material from wash water of domestic washing machines with high capacity and trouble-free operation.

A further object of the invention is to provide a new and improved filter of the character indicated having novel foreign material trapping structure of large capacity and substantial uniformity in operation.

A still further object of the invention is to provide a new and improved filter of the character indicated having a high order of self-cleaning efficiency.

Yet another object of the invention is to provide a new and improved filter of the character indicated having an unusually small number of different parts and adapted to be assembled with great ease and speed in production.

Other objects, features, and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a schematic view of an automatic domestic-type clothes-washing machine showing the flow circuitry associated therewith including a filter embodying features of the invention, the direction of flow being indicated as during the wash cycle;

FIG. 2 is a similar schematic view showing the direction of flow during a drain cycle;

FIG. 3 is an enlarged fragmentary vertical sectional detail view through the upper portion of the filter, taken substantially along the lines III—III of FIG. 2;

FIG. 4 is an enlarged vertical sectional detail view through the filter taken substantially along the line IV—IV of FIG. 1;

FIG. 5 is a fragmentary elevational detail view taken substantially in the plane of line V—V of FIG. 4;

FIG. 6 is a fragmentary bottom plan view of one of the filter disks of the device;

FIG. 7 is a fragmentary bottom plan view of one of the disks showing a slight modification;

FIG. 8 is an enlarged fragmentary sectional detail view taken substantially along the line VIII—VIII of FIG. 7;

FIG. 9 is a greatly enlarged fragmentary plan view taken substantially in the plane of line IX—IX of FIG. 8;

FIG. 10 is a transverse sectional detail view taken substantially along the line X—X of FIG. 9;

FIG. 11 is a bottom plan view of another modified filter disk arrangement;

FIG. 12 is an enlarged diametric sectional view taken substantially on the line XII—XII of FIG. 11;

FIG. 13 is a vertical sectional detail view through a modified form of the filter unit;

FIG. 14 is a fragmentary bottom plan view of one of the filter disks of the device in FIG. 13; and FIG. 15 is a vertical sectional detail view through a further modified form of the filter unit.

Illustrative of a domestic clothes-washing machine system in which a filter or lint trap 20 embodying features of the invention is adapted to be used, FIGS. 1 and 2 depict a tub 21 having mounted therein a spin-dry basket 22 and an agitator 23 operatively connected to a driving motor 24. Also driven by the motor 24 is a reversible circulating pump 25. Wash water is supplied to the tub 21 in any suitable manner and by any suitable means, not shown.

At any desirable time in the wash cycle, or continuously during such wash cycle, the wash water is circulated by action of the pump 25, as indicated by directional flow arrows in FIG. 1. During such flow, the water leaves the lower portion of the tub 21 through a check valve 27 and passes by way of a duct 28 into the upper end of the filter unit 20. Substantially lint-free, and other solids contaminant-free, water passes from the lower end of the filter 20 through a duct 29 to the pump 25, whence it is conducted through a return duct 30 to the tub 21.

At conclusion of the wash cycle, the laundry machine is operated in a drain and spin-dry cycle, during which the pump 25 is reversed, whereby a check valve 31 effects communication between the bottom of the tub 21 with the delivery duct 30, adjacent to the pump 25 which now operates in reverse to drain the tub, as indicated by the directional flow arrows in FIG. 2, and this sends the drain water through the duct 29 into the lower end of the filter 20, acting automatically to flush lint and other foreign material collected in the filter therefrom. Thence, the drain water and flushed out material passes on through the duct 28 and past the check valve 27 into a drain outlet 32. It is to be realized that delivery duct 30 and check valve 31 could be omitted with the result that pump 25 would communicate directly with the bottom of the tub 21.

According to the present invention, the filter unit 20 comprises a sealed, automatic flow-responsive unit. To this end it has a sealed housing including a generally cylindrical main body member 33 with an upright wall and a bottom closure wall 34, defining a chamber 35, the upper end of which is closed by a flexible annularly corrugated diaphragm 37 having an outer marginal portion thereof clamped to the upper edge of the housing body wall as by means of a clamping ring 38 secured by means of screws 39. Attachment of the duct 28 to the filter unit 20 is by means of a nipple extension 40 projecting upwardly centrally on the diaphragm 37 about an inlet opening or port 41. Means for attaching the duct 29 into communication with the chamber 35 through the bottom wall 34 comprise a nipple 42 about an opening or port 43. During the filtering cycle, fluid entering through the port 41 in response to suction through the port 43 by reason of the filter unit being on the suction side of the pump is drawn through a filter assembly 44 in the chamber 35 (FIG. 4).

According to the present invention, the filter assembly 44 is constructed and arranged to assume automatically a filtering condition during the filtering cycle which coincides with the wash cycle of the associated machine, and to assume automatically a self-cleaning condition during the backwashing or flushing cycle. To this end, the filter assembly comprises a stack of preferably identical annular separable filter disks 45 each of which has a central aperture defining with the companion disks of the stack a vertical center opening or passage 48. On its lower end, the stack of filter disks 45 rests on the bottom wall 34 which has means to effect communication between the passage 48 and the port 43 comprising a central depression or recess 49 in underlying alignment with the passage and provided by a downwardly projecting boss 50 on such wall from which, desirable at one side, the duct attachment nipple 42 extends and into which the port 43 opens. Thereby, the lower end of the passage 48 remains at all times in unobstructed communication with the port 43. At its upper end, the passage 48 is closed during the filtering cycle by means of an imperforate closure plate 51 which is of about the same diameter as the filter disks 45 and is pressed down onto the stack by the fluid entering through the top of the housing by way of the port 41. The difference in pressure on the opposite sides of plate 52 due to suction applied to passage 48 via port 48 also serves to press plate 51 down onto the stack.

As a desirable feature of the filter unit, means are provided to prefilter large chunks of material to prevent them from becoming entangled and unduly clogging the main filter provided by the disks 45. Conveniently, economically and efficiently such prefilter means are provided as part of or in association with the filter assembly 44 and are also automatically operative for the prefiltering function and are automatically flushed during the backwashing cycle. For this purpose, the top closure plate 51 and the diaphragm top closure 37 of the housing are cooperatively related so that the top 37 draws down by virtue of the filtering suction into a controlled restricted relation to the plate 51. To aid the prefiltering function and to maintain a restricted spaced relation between the plate and top and to hold them against a completely clogging contact, as well as to avoid straining the diaphragm structure of the top 37, spaced upward finger projections 52 are provided on a central portion 53 of the plate 51 in underlying alignment with the port 41. In a desirable form, the projections 52 are of upwardly tapered generally dentiform shape in a coronet relationship to engage at their tips as stops with the lower end of the nipple 40 which for this purpose is provided with an annular reinforcing and seating flange 54. Through this arrangement a predetermined spaced relationship is provided during the filtering cycle between the inner end of the port 41 and the plate area 53 restricting flow through the prefiltering and spacer stop projections 52 but without substantially throttling flow of the fluid from the port 41 into the chamber 35.

To implement their filtering function, the disks 45 may be of a porous structure so that the fluid can be sucked therethrough while particulate foreign matter is retained, but for the specific purpose of a washing machine lint trap filter, the disks are preferably of a solid structure, with means in their confronting, interface areas providing the filtering function, that is, permitting substantially clear fluid to pass between the disks and enter the passage 48 while trapping and retaining particulate foreign matter. Such means may comprise a textured surface on at least one face of each of the disks providing when in contact with a confronting disk face a patterned or haphazard arrangement of particle-trapping but fluid-passing passageways. In one desirable form, as shown in FIGS. 6–10, the surface texturing may comprise a pattern of contiguous peaks 55 and intervening valleys 57 providing the passageways. In the particular arrangement shown, the peaks 55 are of generally pyramid form with preferably blunt tips or crowns 58. Although substantially the entire face of the disk may be provided with the textured pattern, one preferred arrangement comprises having the textured pattern on a continuous annular area adjacent to the central aperture 47, with a remaining substantial annular area radially outwardly therefrom tapered to provide an annular chamfer area 59 to a blunt perimeter 60. This facilitates entry of fluid to the textured trapping area and provides a progressive trapping or filtering function for the stack wherein larger particles will be trapped between the outer relatively widely spaced margins of the disks, and progressively smaller particles will be trapped as the annular entry between each of the disks narrows, until the fluid with smaller particles enters the textured trapping area wherein the smaller particles are filtered out of the fluid. This arrangement greatly prolongs the filtering efficiency of the filter assembly by, in effect, greatly increasing the area of the filter assembly exposed to the fluid in a compact structure. Further, by trapping the larger particles by graduated sizes in the tapered entry ways between the disks an efficient precoating condition develops wherein filtering efficiency actually improves as the filtering cycle continues. Optionally, to improve the funneling entry of fluid between the disks, the chamfer area 59 may be provided with radial circumferentially spaced ribs 61. The option ribs 61 also serve to prevent the disks 45 from tipping during the back flush operation.

Instead of the integral peak texturing of the particle trapping areas on the filter disks, other preferred forms and arrangements may be employed on the passageway trapping surfaces. For example, as demonstrated in FIGS. 11 and 12 the disk stack may be composed of annular filter disks 62 each having a central passage opening 63 and provided on at least one surface with an annular textured filtering passageway and trapping area 64 comprising a granular or beadlike material applied and held to the disk in a suitable bonded relation such as by means of an appropriate adhesive. For example, the annular surface 64 may be coated with an epoxy adhesive and glass beads sprinkled thereonto and the adhesive cured to retain the beads permanently. In the illustrated example, the disk 62 has at least one, and in this instance both sides tapered to provide annular chamfer areas 65 sloping toward the central opening 63, and with the beaded area 64 on an outer margin of the disk. However, this relationship may be reversed, if preferred to have the same general relationship as demonstrated in respect to the disk 45.

When the filter unit 20 is backwashed or flushed, and the pump 25 operates, as shown in FIG. 2, to pump water into the unit through the port 43, upward pressure on the filtering assembly 44 causes the several elements thereof including the disks 45 and the plate 51, as well as the diaphragm top closure 37 to rise. Initial surge of backwashing fluid rises up through the passage 48 as a flue and lifts the plate 51 from the disk stack, thereby initiating upward flexing of the diaphragm top 37 which may then continue upwardly to its full upwardly extended capacity as shown in FIG. 3 under the full force of backwashing fluid and serving to funnel the fluid to the port 41. While the plate 51 is permitted to rise to a substantial height above the stack of filter disks 45, it is stopped in substantially spaced relation below the closure 37 to afford free and clear flushing spaced relation therebetween. For this purpose, limit stop means are provided comprising a plurality, such as three or four equally spaced generally upwardly and in this instance slightly outwardly extending lugs 67 integral with the perimeter of the plate and engageable with stop means provided by the inner side of the outer margin of the closure 37 backed up by the clamping ring 38 which overhangs the chamber 35 for this purpose. Thereby, the plate 51 is held in its upwardly displaced flushing cycle position with free flow of flushing fluid about its periphery which is held in adequately spaced relation by the lugs 67 not only from the top closure 37 but also from the inner wall of the housing member 33 defining the chamber 35. It may be observed that in order to compensate for the length of the lugs 67, while enabling the central coronet area 53 of the plate 51 to serve as an effective diaphragm reversing starter for the closure 37 during the initial phase of the backwashing cycle, this area is desirably provided on an upwardly projecting central embossment 68 on the plate which is of a height at least such that the tips of the finger projections 52 will extend upwardly above center of the diaphragm when the lugs 67 bring the plate 51 to a stop.

In addition to its passage closing and diaphragm priming functions, the plate 51 serves as a retainer against overdisplacement upwardly of the filter disks 45 and as a lateral deflector of the flushing fluid. In a desirable construction, the filter disks 45 are made from a material which is at least slightly heavier than water so that their normal tendency is to sink except when impelled upwardly by the force of the flushing fluid thereagainst. As the flushing fluid forces upwardly in the passage 48, lifting the plate 51 from the stack of filter disks, the disks are enable to separate individually relative to the adjacent disks so that there is a generally mutual separation of the disks for flushing collected filtered material therefrom. Flushing of the disks in enhanced by their agitation during the flushing cycle and during which they flutter, shuffle and spin relative to one another and to the housing. Such agitation is enhanced by permitting the disks a limited range of lateral as well as vertical movement, and by deflection of the flushing fluid laterally by the deflector barrier provided by means of the plate 51 which compels the flushing fluid to pass around its periphery and thus laterally toward and along the vertical wall of the housing defining the chamber 35, substantially as shown by directional arrows in FIG. 3. By having the filter disks 45 of smaller differential diameter than the inner vertical wall of the housing defining the chamber 35 but limited to assure continuity of the passage 48 even when the disks are relatively displaced laterally to their maximum permitted extent, it will be clear that during a flushing cycle there will be constant and considerable agitation of the disks as they move around and cause the flushing fluid to flow upwardly erratically.

Although the disks 45 are shown in FIGS. 3 and 4 as centered within the chamber 35 they will, as a practical matter, as a result of the flushing cycle, assume a generally laterally offset relation haphazardly relative to one another within the circumscribing limits of the vertical housing wall. However, the differential diameter of the disks and the surrounding housing wall is so related to the diameter of the passage openings 47 as to avoid blocking the passage 48 even when two contiguous disks are displaced to their maximum lateral extent. Also, the width of the textured annular areas of the disks is such that in the maximum relative lateral displacement permitted for the disks there will always be adequate continuity of interface confrontation between the disk surfaces and the textured areas to assure efficient filtration at the conclusion of a flushing cycle and resumption of a filtering cycle. It will also be observed that the diameter of the recess 49 is sufficiently greater than the diameter of the central openings 47 in the filter disks to assure overhanging of the inner margins of the disks relative to the recess in all laterally displaced positions of the disks.

In the modified arrangement of FIG. 13, a filter unit 69 is shown which in general respects functions substantially the same as the filter unit 20, for this purpose comprising a housing 70 enclosing a filtration chamber 71 within which is contained a filter assembly 72 comprising a stack of filter disks 73 of differential diameter relative to the inner vertical wall of the housing and having respective central openings 74 providing a vertical passage 75 closed at its upper end by a plate 77 which in this instance is of generally the same diameter as the disks. During a filtering cycle, fluid introduced into the chamber 71 through a port 78 in a top closure 79, as for example in the manner described in connection with FIG. 1, is compelled to flow through the disk stack from the perimeter thereof into the passage 75 and thence into a recess 80 defined by a downward boss 81 in a bottom wall 82 of the housing to exit through a port 83 leading from the recess 80. While the filter disks 73 may be of the same or similar construction as the previously described filter disks 45 and 62, they may embody the construction shown in FIGS. 13 and 14 wherein an annular area 84 of substantial width has a textured surface which may be similar to the textured surface 64 of the disk 62 of FIGS. 11 and 12, or any other preferred textured arrangement. An annular outer marginal area 85 of the disk 73 is chamfer tapered as shown. When backwashing fluid raises the plate 77 during a flushing cycle, circumferentially spaced upwardly projecting marginal lugs 77a on the plate serve as stops and spacers should the plate be raised into contact with the top closure 79.

In the modification of FIG. 15, a filtering unit 86 is depicted which may be employed similarly as the filter unit 20 in the system of FIGS. 1 and 2 and functions similarly and to the same effect. In the filter unit 86, a housing 87 provides a filter chamber 88 closed at the bottom by a wall 89 at the top by a removable closure 90. Within the chamber 88 a filter assembly 89 is interposed between a port 91 in the bottom wall 89 and a port 92 in the upper portion of the housing and in this instance in the vertical wall of the housing adjacent to the top closure 90. In this instance, similarly as in the other described forms of the invention, the filter assembly comprises a stack of a plurality of annular filter disks 93 each of which has a central opening 94 aligned with the other such openings to provide a vertical passage 95 through the stack aligned with the port 91. During the filtering cycle, the upper end of the passage 95 is closed by means of a member in the form of a semispherical ball check valve 97 which engages the uppermost of the disks 93 and thus compels the fluid to be filtered to pass through the disk stack from the perimeter thereof to the passage 95. During a backwashing cycle, the flushing fluid lifts the member 97 from the upper end of the passage 95 and the disks 93 are flushed in the same manner as hereinbefore described in respect to the disks 45. Engagement of the upper disk 93 against the closure 90 is prevented by interposition of the member 97 between such disk and the top closure. Further, to prevent gross misalignment of the disk 93 or flipping thereof during the backwashing activity, a guide stem or rod 98 is desirably provided integral with and projecting downwardly from the member 97 and is of a length to remain at its lower end portion within the port 91 even when the member 97 is raised all the way to the top closure 90. The disks 93 may be of similar construction, as preferred, to anyone of the hereinbefore described filter disks and is shown as having at least one surface of the disk chamferred or tapered whereby to afford a graduation in particle size collection during filtration.

In any of the several forms of the invention described herein, or permutations thereof, most of the components of the filter units can be made from suitable plastic material such as polypropylene, acrylic material, and the like and at least in respect to the filter disks the material may be reinforced or filled with suitable fiber such as asbestos. Housing parts may be molded, as may also the filter disks having integral textured filtering surface areas. Where feasible, the filter disks may be stamped from sheet material. The top holddown, closure, deflector members for the filter disk stacks may be molded or stamped as may be deemed most suitable for the particular construction desired. Assembly of the components to provide the respective filter units is simple and can be quickly effected in high-speed mass production. Likewise the closure may be effected by means of spin welding, sonic welding adhesive bonding or the like in place of screws 39.

Although minor modifications might be suggested by those versed in the art, it should be understood that we wish to embody within the scope of the patent warranted hereon all such modifications as reasonably and properly come within the scope of our contribution to the art.

The embodiments of the invention in which an exclusive property or privilege is claimed are defined as follows:

1. A filter unit of the character described, comprising:
   a housing having a chamber therein closed except for spaced ports through which fluid to be filtered is adapted to pass in one direction and backwashing fluid is adapted to pass in the opposite direction;
   a filtering assembly in said chamber including a stack of separable disks located between said ports and having respective central openings therethrough generally aligned in the stack to provide a passage communicating at one end with one of said ports;
   means closing said passage at its opposite end to compel fluid to be filtered entering said chamber through the other of said ports in a filtering cycle to pass through the filter disk stack from its outer perimeter inwardly into said passage;
   said stack being compressed responsive to fluid pressure in said filtering cycle whereby filtering of fluid flowing inwardly through said stack is effected;
   said disks being separable responsive to fluid pressure in a backwashing cycle wherein fluid is introduced under pressure through said one port to enter said passage and act separatingly on said disks and said closing means whereby flushing of said disks is effected by flow of the backwashing fluid between the separated disks and out of the stack to said other of said ports;
   means on annular confronting interface areas of the disks concentric with said openings to enhance filtering efficiency of the stack; and
   other annular interface areas of said disks being chamfered to taper away from said first-mentioned annular areas to edges of the disks to enhance movement of fluid between said edges and said first-mentioned annular areas.

2. A filter unit according to claim 1, said means on said annular confronting interface areas comprising peaks of generally pyramid form and intervening valleys providing passageways across said first-mentioned annular areas.

3. A filtering unit according to claim 1, wherein said chamfered areas taper inwardly to edges of the disks defining said openings.

4. A filter unit according to claim 1, in which said chamfered areas taper radially outwardly to the perimeter edges of said disks.

5. A filter unit according to claim 4, including circumferentially spaced radially extending ribs on said chamfered areas improving the funneling entry of fluid across said areas to said filtering efficiency enhancing means and also serving to prevent the disks from tipping during the backwashing cycle.

6. A filter unit according to claim 1, including a flat wall in said housing having an opening providing communication for said one port and normally aligned with said disk stack passage, and endmost disk facing said wall having the annular area thereof with said filtering efficiency enhancing means thereon engaging said wall in filtering relation about said wall opening.

7. A filter unit of the character described, comprising:

a housing having a chamber therein closed except for spaced ports through which fluid to be filtered is adapted to pass in one direction and backwashing fluid is adapted to pass in the opposite direction;

a filtering assembly in said chamber including a stack of separable disks located between said ports and having respective openings therethrough generally aligned in the stack to provide a passage communicating at one end with one of said ports;

means closing said passage at its opposite end to compel fluid to be filtered entering said chamber through the other of said ports in a filtering cycle to pass through the filter disk stack from its outer perimeter inwardly into said passage;

said stack being compressed responsive to fluid pressure in said filtering cycle whereby filtering of fluid flowing inwardly through said stack is effected;

said disks being separable responsive to fluid pressure in a backwashing cycle wherein fluid is introduced under pressure through said one port to enter said passage and act separatingly on said disks and said closing means whereby flushing of said disks is effected by flow of the backwashing fluid between the separated disks and out of the stack to said other of said ports; and prefiltering means between said stack and said other port separable for flushing responsive to fluid pressure during the backwashing cycle.

8. A filter unit according to claim 7, including a surface within said chamber about said other of said ports, and projections on said means closing said passage and engaging said surface to provide said prefiltering means.

9. A filter unit according to claim 7, said prefiltering means comprising projections on said closing means, and a diaphragm closure on said housing having said other port therethrough located to charge fluid to be filtered through said projections before passing to the disk stack.

10. A filter unit according to claim 9, said projections being of tapered generally dentiform-shape in a coronet relationship to engage at their tips with said diaphragm closure.

11. A filter unit according to claim 10, said diaphragm closure moving away from said closing means during the backwashing cycle, a fixed annular area on said housing about said diaphragm closure, and spacer lugs on said closing means engageable with said fixed area during the backwashing cycle to maintain a flushing spacing between the closing means and the diaphragm closure.

12. A filter unit of the character described, comprising:

a housing having a chamber therein closed except for spaced ports through which fluid to be filtered is adapted to pass in one direction and backwashing fluid is adapted to pass in the opposite direction;

a filtering assembly in said chamber including a stack of separable disks located between said ports and having respective openings therethrough generally aligned in the stack to provide a passage communicating at one end with one of said ports;

means closing said passage at its opposite end to compel fluid to be filtered entering said chamber through the other of said ports in a filtering cycle to pass through the filter disk stack from its outer perimeter inwardly into said passage;

said stack being compressed responsive to fluid pressure in said filtering cycle whereby filtering of fluid flowing inwardly through said stack is effected;

said disks being separable responsive to fluid pressure in a backwashing cycle wherein fluid is introduced under pressure through said one port to enter said passage and act separatingly on said disks and said closing means whereby flushing of said disks is effected by flow of the backwashing fluid between the separated disks and out of the stack to said other of said ports; and an end closure on said housing having said other port therethrough located to charge fluid to be filtered toward said closing means, said end closure being movable toward and away from said closing means and functioning to thrust toward said closing means during the filtering cycle and moving away from said closing means during the backwashing cycle.

13. A filter unit according to claim 12, said closing means having spacer projections thereon engageable with said end closure and functioning at the beginning of the backwashing cycle to thrust said end closure away from the stack.

14. A filtering unit according to claim 12, said end closure comprising a diaphragm structure, and said closing means having stop projection structure thereon against which said end closure presses during the filtering cycle and from which the end closure is separable during the backwashing cycle.

15. A filtering unit according to claim 14, said closing means comprising an imperforate disk having a central portion from which said projections extend in generally coronet relation with spaced therebetween and said other of said ports has an engagement surface thereabout on said diaphragm engaged by said projections and thereby providing a prefilter relationship during the filtering cycle.

16. A filter unit according to claim 15, said housing having a fixed area about said diaphragm facing in normally substantially spaced relation generally toward said closing means, said closing means having lugs thereon projecting toward said fixed area and engageable therewith during the backwashing cycle to limit movement of said closing means toward said end closure whereby the end closure is movable into spaced relation to said closing means during the backwashing cycle while the closing means is movable separable with respect to the disks in the stack to facilitate the backwashing action.

17. A filter unit according to claim 12, wherein said end closure comprises a diaphragm structure centrally movable toward said closing means during the filtering cycle, said closing means having stop structure thereon with which the diaphragm structure is engageable during the washing cycle to limit the movement of the diaphragm structure toward the closing means, said stop structure serving as starting means to move said diaphragm structure away from the stack during backwashing cycle, and means for limiting following movement of the closing means relative to the diaphragm structure during the backwashing cycle to enable substantial separation of the diaphragm structure relative to the closing means.

18. A filter unit of the character described, comprising:

a housing having a chamber therein closed except for spaced ports through which fluid to be filtered is adapted to pass in one direction and backwashing fluid is adapted to pass in the opposite direction;

a filtering assembly in said chamber including a stack of separable disks located between said ports and having respective central openings therethrough generally aligned in the stack to provide a passage communicating at one end with one of said ports; and means closing said passage at its opposite end to compel fluid to be filtered entering said chamber through the other of said ports in a filtering cycle to pass through the filter disk stack from its outer perimeter inwardly into said passage;

said stack being compressed responsive to fluid pressure in said filtering cycle whereby filtering of fluid flowing inwardly through said stack is effected;

said disks being separable responsive to fluid pressure in a backwashing cycle wherein fluid is introduced under pressure through said one port to enter said passage and act separatingly on said disks and said closing means whereby flushing of said disks is effected by flow of the backwashing fluid between the separated disks and out of the stack to said other of said ports;

said closing means comprising a valve member seating over the end of said passage remote from said one port and provided with a guide stem extending through said passage and into said one port and being of a length to remain in guiding relation within said one port in the maximum separated condition of the disks during the backwashing cycle.

* * * * *